United States Patent [19]

Lazay et al.

[11] 4,447,125
[45] May 8, 1984

[54] LOW DISPENSION SINGLE MODE FIBER

[75] Inventors: Paul D. Lazay, New Providence; Paul J. Lemaire, Basking Ridge; Arthur D. Pearson, Bernardsville, all of N.J.

[73] Assignee: Bell Telephone Laboratories, Incorporated, Murray Hill, N.J.

[21] Appl. No.: 364,623

[22] Filed: Apr. 1, 1982

Related U.S. Application Data

[63] Continuation-in-part of Ser. No. 271,957, Jun. 9, 1981.

[51] Int. Cl.³ .............................................. G02B 5/172
[52] U.S. Cl. ................................. 350/96.30; 350/96.34
[58] Field of Search ............... 350/96.29, 96.30, 96.31, 350/96.34

[56] References Cited

U.S. PATENT DOCUMENTS

| | | | |
|---|---|---|---|
| 4,217,027 | 8/1980 | MacChesney et al. | 350/96.3 |
| 4,300,930 | 11/1981 | Chang | 350/96.30 X |
| 4,402,570 | 9/1983 | Chang | 350/96.30 |

FOREIGN PATENT DOCUMENTS 52-65457  5/1977  Japan ................. 350/96.30

OTHER PUBLICATIONS

Niizeki, "Single Mode Fiber at Zero-Dispersion Wavelength," *Topical Mtg. on Int. & Guided Wave Optics*, Salt Lake City, Jan. 1978, pp. MBI-1 to MBI-4.
White et al., "Zero Total Dispersion in Step-Index Monomode Fibres at 1.30 and 1.55 μm," *Electron. Lett.*, vol. 15, No. 13, Jun. 1979, pp. 396-397.
Ainslie et al., "Preparation of Long Lengths of Ultra-Low-Loss Single-Mode Fibre," *Electron. Lett.*, vol. 15, No. 14, Jul. 1979, pp. 411-413.
Kawachi et al., "100 KM Single Mode VAD Fibres," *Electron. Lett.*, vol. 17, No. 2, Jan. 1981, pp. 57-58.
Electronics Letters, vol. 15, No. 15, "Dispersion-Free Single-Mode Fibre in 1.5 μm Wavelength Region," H. Tsuchiya and N. Imoto, pp. 476-478, Jul. 19, 1979.
Electronics Letters, vol. 15, "Dispersion Minimisation in Single-Mode Fibres Over a Wide Spectral Range," K. Okamoto, T. Edahiro, A. Kawana and T. Miya, pp. 727-729, 1979.
Bell System Technical Journal, vol. 56, No. 5, "Loss Analysis of Single-Mode Fiber Splices," D. Marcuse, pp. 703-718, May-Jun. 1977.

*Primary Examiner*—John D. Lee
*Attorney, Agent, or Firm*—Richard D. Laumann

[57] ABSTRACT

A low-loss single mode fiber with low total dispersion within the wavelength range 1.25-1.385 μm and low added cabling loss is disclosed. The fiber has relatively high Δ to assure low cabling loss. The high Δ is obtained, however, without paying a cost in high material dispersion by providing at least 20 percent of the Δ by down-doping of the fiber cladding.

2 Claims, 2 Drawing Figures

LOW DISPENSION SINGLE MODE FIBER

CROSS REFERENCE TO RELATED APPLICATION

This application is a continuation-in-part of my copending application, Ser. No. 271,957, filed June 9, 1981.

BACKGROUND OF THE INVENTION

1. Field of the Invention

This invention is a low-loss (less than 1 dB/km at 1.30 μm) single mode fiber with low dispersion (less than 5 psec/nm-km) within the wavelength range 1.25-1.385 μm and having low added loss (less than 0.25 dB/km) due to cabling.

2. Disclosure of Interest

Full appreciation of the advances represented by the inventive fiber requires at least a cursory review of certain aspects of fiber design technology.

The realization of low-loss optical fibers in the early 1970's focused research on the attainment of higher bandwidth for greater information carrying capacity. Initially, graded multimode fibers were pursued, in part, because they were easier to fabricate than single mode fibers. However, workers were always aware that single mode fibers have greater inherent potential for high bandwidth, and as years passed, the search for ever higher bandwidth fibers once again focused attention on single mode fibers.

It was known that although single mode fibers display none of the inter-mode dispersion associated with multimode fibers, they do have finite pulse spreading, and hence bandwidth limitation, due, in part, to material dispersion—the dependence of index of refraction, and consequently traversal time, on wavelength. Any pulse, by Fourier definition a combination of many different wavelengths, will therefore experience broadening when traversing the fiber. However, the material dispersion phenomenon does vanish at certain wavelengths —e.g., approximately 1.28 μm for fused silica, 1.35 μm for heavily doped germania silica, and 1.26 μm for fluorine-doped silica —and consequently these might appear at first sight to be desirable operating wavelengths, all other considerations being equal. Nevertheless, it was found that even at the material dispersion null point relatively significant pulse broadening did occur due, in part, to waveguide dispersion—the wavelength dependence of traversal time associated with purely waveguide parameters.

First principles indicate that in certain regions of the spectrum dispersive effects associated with waveguide dispersion are of opposite sign than those associated with material dispersion. Consequently, the possibility arises that fibers may be designed with a view toward canceling material dispersion against waveguide dispersion and hence yielding essentially zero dispersion at a particular wavelength (H. Tsuchiya et al, *Electronics Letters*, 15, 476 (1979)). Desirable wavelengths for predetermined zero dispersion include 1.55 μm where the loss properties of a silica-based fiber are lowest. [In "W-type" fibers it was found that low dispersion could be obtained over a relatively broad wavelength range, (K. Okamoto et al, *Electronics Letters*, 15, 729 (1979)).]

In order to obtain sufficient waveguide dispersion to cancel the material dispersion at 1.55 μm in typical germania doped single mode fibers, relatively small core diameters must be used, since waveguide dispersion increases in magnitude with decreasing core diameter. The use of a graded core may permit a somewhat larger core diameter, however, the effect of core diameter on splicing always remains a serious consideration which must be carefully weighed in the design of high bandwidth single mode fibers. Furthermore, even if small core single mode fibers for operation at 1.55 μm would be feasible, they would be relatively useless at the present time since there is a dearth of high quality, commercially available, spectrally narrow, light sources operating at 1.55 μm. This has forced the worker in the field to focus on other spectral regions where sources are available and where local minima in transmission loss occur. Such a region where commercial sources are available and where there is a local minimum in loss, occurs in the vicinity of 1.3 μm, (1.25-1.385 μm), stimulating interest in single mode fibers for operation in this spectral region.

A threshold consideration for operation at shorter wavelengths, such as 1.3 μm, involves the need to lower the cutoff wavelength $\lambda_c$ to values close to, but below, the operating wavelength. The cutoff wavelength is that wavelength below which higher order modes may be propagated. Most desirable transmission characteristics occur when the transmission wavelength is somewhat above, but close to, cutoff. Operation at 1.5 μm allows relatively high cutoff wavelengths, i.e., approximately 1.45 μm. However, single mode operation at 1.3 μm requires much lower cutoff wavelengths.

The cutoff wavelength is proportional to the product of the core diameter and the square root of $\Delta$, where $\Delta$ is the relative index difference between the core and the cladding. Hence, for low cutoff wavelengths this product must be small. However, $\Delta$ itself must be relatively small in typical single-mode fibers since in high $\Delta$ fibers the material dispersion, a quantity that generally increases with increasing $\Delta$'s, would be too high to allow cancellation by waveguide dispersion at 1.3 μm. This is so since the waveguide dispersion at 1.3 μm is large enough to cancel material dispersion in high $\Delta$ fibers only if the core diameter is extremely small. It would consequently appear that low dispersion (high bandwidth) single mode fibers for operation at 1.3 μm would require relatively small values of $\Delta$. However, if $\Delta$ is too small, packaging losses become too high. A satisfactory design for high bandwidth low packaging loss single mode fibers for operation in the vicinity of 1.3 μm has consequently eluded workers in this field.

SUMMARY OF THE INVENTION

This invention is a low-loss (less than 1 dB/km) single mode fiber with low dispersion (less than 5 psec/nm-km) within the wavelength range 1.25-1.385 μm, and having low added loss (less than 0.25 dB/km) due to cabling. The fiber has relatively high $\Delta$ (greater than 0.3 percent) to assure low cabling loss. The high value of $\Delta$ is obtained without paying a cost in high material dispersion by providing at least 20 percent of the $\Delta$ by down-doping of the fiber cladding (adding a dopant to lower the index of the material). The resulting relatively small amount of material dispersion is cancelled by an appropriate amount of waveguide dispersion so as to obtain low dispersion values in the vicinity of 1.3 μm (1.25-1.385 μm). Although relatively small core diameters (less than 9 μm) are required for appropriate waveguide dispersion values, splicing losses are acceptable due to low contributions from angular offset at the splice when transverse offset is significant.

DETAILED DESCRIPTION

Figure 1:
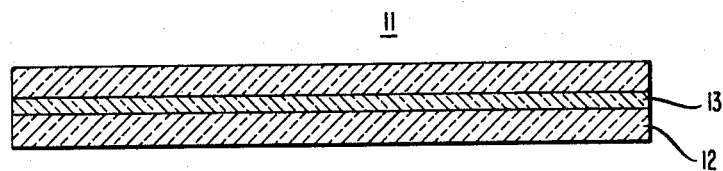
FIG. 1 is a schematic representation of the inventive fiber.

The problem addressed by this invention becomes one of how to obtain values of $\Delta$ and core diameters in a low dispersion, low-loss, single mode fiber which will provide cutoff at sufficiently low wavelengths for operation at the local loss minimum which occurs in the vicinity of 1.3 $\mu$m. A solution to this problem, as manifested in this invention, relies on the realization that an up-doped core with a down-doped cladding can, at once, provide a high $\Delta$ and low material dispersion in the vicinity of 1.3 $\mu$m. "Down dopants," such as fluorine, in the cladding combine with the up-doped core to yield low material dispersion. The effect of the cladding in yielding low material dispersion values will be significant since in single mode fibers large amounts of energy propagate within the cladding. Consequently, an inventive aspect of the fiber claimed in this application is tied to the realization that high $\Delta$ does not necessarily result in high material dispersion in the vicinity of 1.30 $\mu$m, when reliance is had on a down-doped cladding. Sufficiently low cutoff wavelengths are obtained by employing relatively small core diameters with the relatively high $\Delta$'s which guarantee low packaging loss.

The inventive fiber does require relatively small core diameters (less than 9 $\mu$m), and practitioners have been hesitant to use such small core single mode fibers for fear of prohibitive splicing losses. However, theoretical studies [D. Marcuse, *Bell System Technical Journal*, 56, 703 (1977)] indicate that the product of splicing loss due to transverse offset and angular offset is approximately constant, hence allowing consideration of small core diameter fibers. Although such a fiber may suffer significant splicing loss due to transverse offset of the splice, the fiber will have low splice loss due to angular offset, and vice versa, hence rendering the splicing loss problem somewhat less serious than had been widely considered previously.

While the inventive fiber is patentably distinct merely on the basis of its design characteristics, the motivating factors which result in these design characteristics heighten, still further, the patentable aspects of the subject fiber.

Whereas previously, the practitioner who attempted to obtain zero total dispersion engineered the waveguide dispersion to cancel the material dispersion, the designer of the subject fibers approaches his task from a totally different vantage point. The subject fibers are designed in the first instance by specifying a $\Delta$ which is sufficiently high so as to obtain a desirably small spot size. The spot size is inversely proportional to the square root of $\Delta$ and if $\Delta$ is high enough, the spot size is small enough to yield a desirably low cabling loss. $\Delta$'s in these fibers are generally greater than 0.3 percent yielding spot sizes generally less than 4 $\mu$m. (The spot size here is defined as the fiber radius at the 1/e power point.)

The next step in the design is to determine an appropriate cutoff wavelength, depending on desired operating parameters, and setting the core diameter of the fiber accordingly. In the instant fibers, the cutoff wavelength is set at approximately 1.25 $\mu$m (1.20$\pm$0.1 $\mu$m) in view of the fact that the operating wavelength is contemplated to be at 1.31 $\mu$m. Required core diameters are then less than 9 $\mu$m.

Having determined the $\Delta$ and the core diameter of the fiber, the waveguide dispersion of the fiber is essentially fixed and cannot be effectively used to determine a zero dispersion wavelength, as in the prior art. However, in a departure from the prior art, applicants alter the material system used to fabricate the fiber so as to obtain a material dispersion value which will cancel the waveguide dispersion in the vicinity of 1.31 $\mu$m. The demands on the material system are then both the requirement of relatively high $\Delta$, as previously discussed, and relatively low material dispersion to cancel the waveguide dispersion. In typical germania-doped single mode fibers, high $\Delta$'s result in relatively high material dispersion. As discussed above, in the inventive fiber the high $\Delta$ is obtained, in part, by down-doping the cladding to obtain a high $\Delta$ while at the same time obtaining a relatively low material dispersion. FIG. 1 is then a schematic representation of the inventive fiber 11, with up-doped core 13 and down-doped cladding 12. A portion of the fiber associated with the substrate tubes used in MCVD are not necessarily shown.

Other considerations also demand that both the cladding and the core compositions be available as variable parameters at this point in the design. If the cladding of the fiber is somehow predetermined, then the only remaining parameter which might affect the material dispersion is the composition of the core. However, if the cladding of the fiber were predetermined, the previous fixing of $\Delta$ would determine the index of refraction of the core as well. Consequently, in the inventive fibers the composition of both the cladding and the core are left as variable parameters at this point in the design.

Both the desire to obtain zero dispersion in the vicinity of 1.31 $\mu$m, and the desire to obtain a relatively low-loss fiber, results in the selection of a lightly up-doped core in the subject fiber. Consequently, in the inventive fiber the core is doped with, for example, germania to a level less than 5 mole percent. However, to obtain the necessary predetermined $\Delta$ and at the same time a relatively low material dispersion, the cladding must be deeply down-doped with a material which lowers the index of refraction of the cladding much below that of the core. Boron which is known to have this capability has a strong absorption band at 1.3 $\mu$m and, hence, is undesirable. However, fluorine which also tends to lower the index of refraction has a higher wavelength absorption band and consequently may be used in the inventive fiber to down-dope the cladding.

Figure 2:
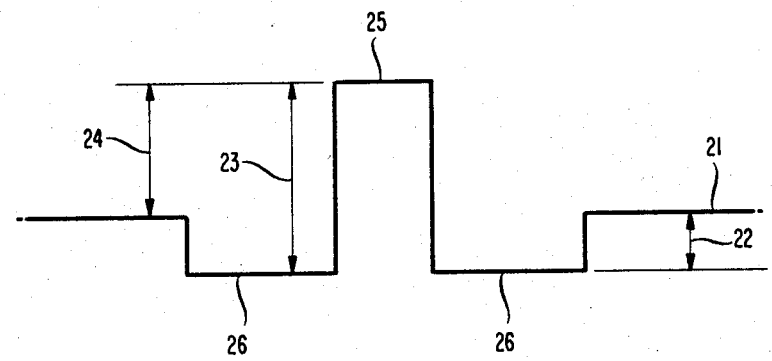
FIG. 2 is a representation of the refractive index configuration of an embodiment of this invention.

The index distribution in an embodiment of the inventive fiber is then shown in FIG. 2. In this FIGURE, 25 is the up-doped core region of the fiber and 26 is the down-doped cladding region. That portion of the $\Delta$ of the fiber which is attributable to the down-doped cladding is shown schematically as 22 and accounts for at least 20 percent of the fiber $\Delta$, 23. The remainder of the fiber $\Delta$, 24 is clearly due to the up-doped core. 21 is the index value of the substrate tube and in many embodiments will be essentially pure silica. However, other inventive embodiments may involve doped substrate tubes, in which case the index of refraction of the substrate tube shown as 21 may be equal to that of the cladding 26.

CHARACTERISTICS OF THE INVENTIVE FIBER

1. Mode Characteristics

The fiber is a single mode optical fiber. Clearly, such a definition has meaning only in the context of a particular transmission wavelength. Any fiber will support more than one mode at low enough wavelengths. In order for it to be a single mode fiber, the fiber must be operated in a region above the cutoff wavelength. The inventive fiber will have a cutoff wavelength less than 1.31 $\mu$m and will be a single mode fiber for transmission wavelengths above the cutoff value. The term "single mode fiber" is used to indicate operation in such a region. In any event, the fiber will be clearly distinguished from multimode fibers which support many hundreds of modes as opposed to a single mode fiber which even below its cutoff wavelength supports only a limited number of modes in the region of the spectrum from 0.4 to 2 $\mu$m.

2. $\Delta$ Value

The inventive fiber is, in part, characterized by relatively high $\Delta$ values, e.g., greater than 0.3 percent, although less than 0.75 percent. Definitions of $\Delta$ vary from practitioner to practitioner. In the current context $\Delta$ is defined as the index of refraction of the core minus the index of the cladding all divided by the index of refraction of the cladding. High $\Delta$ values are obtained in the inventive fiber, without paying a material dispersion penalty, by down-doping the cladding in a silica based fiber with material such as fluorine to yield a fiber that has a lower zero material dispersion point than fibers which are solely up-doped. In the inventive fiber at least 20 percent of the $\Delta$ value will be attributable to the down-doping of the cladding. Recent studies indicate that graded index single mode fibers may have desirable characteristics at least, in part, in allowing larger diameter cores. Clearly, the inventive fiber contemplates possible use of such a gradation in the index of refraction. Under such a circumstance, $\Delta$ is defined by the associated maximum index of refraction of the core and minimum index of refraction of the cladding.

3. Core Diameter

The core diameters in the inventive fibers are determined from a design point of view by requiring the cutoff wavelength to be below the operating wavelength of approximately 1.30 $\mu$m. The waveguide dispersion is then uniquely defined and must be cancelled by appropriate values of material dispersion. Such cancellation results in an essentially zero total dispersion within the operating wavelength of interest, namely, 1.25 to 1.385 $\mu$m. Core diameters in this fiber design, necessary for such low total dispersion, are less than 9 $\mu$m, a departure, at least from currently preferred practice. This departure can be tolerated even in the face of splicing considerations due to applicants' appreciation for the inverse behavior between splicing loss due to angular offset and that due to transverse offset.

4. Cladding to Core Ratio

Disclosures currently available discuss "W-type fibers" in which the cladding is down-doped. Such fibers generally have claddings which comprise two specific regions separated by an abrupt change (generally greater than 0.0038) in the index of refraction. However, the inventive fiber described in this application generally has no such abrupt change in the index distribution of the cladding and, in addition, generally has a down-doped-cladding to core diameter ratio greater than 2, thereby clearly distinguishing it from the down-doped fibers (including W-type) currently described in the literature. Of course, the substrate tube which may be used in fabricating the inventive fibers might have an index of refraction higher than the cladding giving the appearance of a W-type configuration, namely, an up-doped core, a down-doped cladding region and a second outer higher index of refraction region. However, the requirement that the inventive fibers have no abrupt index change in the cladding and have a down-doped-cladding to core ratio greater than 2 is meant to avoid essentially all W-type fibers.

Other inventive embodiments involve use of a doped substrate tube. In such circumstances, the index of refraction of the substrate tube may equal that of the cladding yielding only a single index of refraction region from cladding to substrate tube region with no abrupt change in the index.

5. Dopants

At the present time preferred dopants involve germania in the core and fluorine in the cladding. Clearly, the inventive fiber need not be limited to these specific dopants. However, when they are used it is found that the core will generally be up-doped with less than 5 mole percent germania and the cladding will generally be down-doped with greater than 0.5 mole percent fluorine. The addition of other dopants, such as phosphorus, for example in the cladding, in part, for improved processing characteristics, may be contemplated within the spirit of this invention.

EXAMPLE

1. Fiber Fabrication

The preform was made by MCVD (U.S. Pat. No. 4,217,027) using a 19×25 TO8-WG silica tube. The reactant flow rates for cladding deposition were $SiCl_4$ 3.0 gm/min.; $POCl_3$ 0.052 gm/min.; $CF_2Cl_2$ 105 cc/min. and excess oxygen 4300 cc/min. The cladding was deposited in 16 passes. No pressurizing device was used since the tube shrinkage amounted to only about 1 mm in the OD over the course of the deposition. The core was deposited in 2 passes using flows of 0.54 gm/min. $SiO_2$, 0.077 gm/min. $GeCl_4$ and 1300 cc/min. excess oxygen. Compensated collapse was accomplished in 6 shrinking passes during which a trace of $GeCl_4$ vapor carried on oxygen was flowed through the tube. The tube was then sealed at the downstream end and collapse was completed in 2 more passes.

After measuring the cross sectional dimensions of the preform in an immersion cell, fiber was drawn and coated in-line with a UV cured epoxy acrylate resin. The fiber dimensions were OD 114 $\mu$m; core diameter 7.5 $\mu$m, D/d (cladding-to-core diameter ratio) 5.9, and length 1 km.

2. Characterization of Fiber

The fiber was characterized by measuring the cutoff wavelength, the spectral loss and the total dispersion.

Cutoff was determined as the location of the rapid drop in power transmitted through a 3 meter length as the wavelength of the incident light was increased. A well-defined cutoff was located at $\lambda_c = 1.192 \pm 0.005$ $\mu$m.

The spectral loss was measured from 1.0 to 1.7 $\mu$m using a far end/near end technique with a 3 meter near end length. The loss is measured with and without a single 40 mm radius loop in the near end length. Quite surprisingly, the loss curve without the loop was essentially identical to that with the loop, even in the vicinity of cutoff at 1.19 μm. It has been our experience that this is a signature of very good mode confinement. The loss has a local minimum at 1.30 μm of 0.57±0.03 dB/km, a local maximum at the 1.39 μm OH peak of 7.7 dB/km, and a minimum loss of 0.40 dB/dm at 1.50 μm. Beyond 1.50 μm the loss rises rapidly and all evidence indicates that the loss is unbounded. The loss at 1.30 μm is not adversely affected.

The total chromatic dispersion in the single mode regime was calculated from the derivative of group delay versus wavelength data. This data was obtained using narrow pulses from a Raman fiber laser pumped with mode-locked Q-switched pulses at 1.06 μm from a Nd:YAG laser. The wavelength of the pulses emerging from the Raman fiber was selected with a grating monochromator. The zero dispersion wavelength, $\lambda_o$ is 1.314 μm.

3. Experimental Parametric Study

Subsequent to the fabrication of the fiber discussed in Sections 1 and 2 of this example, numerous fibers were fabricated with parameters which varied about those of the fiber described in Sections 1 and 2 of this example. As a result of this parametric study, specific ranges of design parameters for the preferred practice of this invention were obtained. These preferred ranges include an up-doped core which contributes a refractive index increase relative to that part of the fiber originating in the substrate tube of less than 0.40 percent and greater than 0.30 percent, a down-doped cladding which contributes a refractive index decrease relative to that part of the fiber originating in the substrate tube of less than 0.22 percent and greater than 0.15 percent, a core diameter of between 8.7 and 7.5 microns and a ratio of diameter of the down-doped cladding to the diameter of the up-doped core of greater than 5.5. A specific embodiment found most preferable for commercial application comprises a fiber with an up-doped core whose increase in refractive index relative to that part of the fiber originating in the substrate tube is 0.38 percent plus or minus 0.02 percent, a down-doped cladding whose refractive index decrease relative to that part of the fiber originating in the substrate tube is 0.19 plus or minus 0.02 percent, the diameter of the up-doped core being 8.3 plus or minus 0.2 microns and the ratio between the diameter of the down-doped cladding and the diameter of the up-doped core being 6.0 plus or minus 0.2. In all of the above instances the refractive index differences were measured using the refracted near field technique on the fiber rather than on the preform for greater accuracy.

What is claimed is:

1. A single mode fiber comprising a substrate tube and within said substrate tube:
   (a) an up-doped core which contributes a refractive index increase relative to that part of the fiber originating in said substrate tube of less than 0.40 percent and greater than 0.30 percent,
   (b) a down-doped cladding with no abrupt change in index of refraction which contributes a refractive index decrease relative to that part of the fiber originating in said substrate tube of less than 0.22 percent and greater than 0.15 percent,
   (c) a core diameter of between 8.7 and 7.5 microns and,
   (d) a ratio of diameter of the down-doped cladding to the diameter of the up-doped core of greater than 5.5, the cutoff wavelength being less than 1.31 μm, the Δ of the fiber being greater than 0.3 percent and less than 0.75 percent, the dispersion of the fiber being less than 5 psec/nm-km within the wavelength range of 1.25–1.385 μm.

2. The fiber of claim 1 comprising
   (a) an up-doped core which contributes a refractive index increase relative to that part of the fiber originating in said substrate tube of 0.38 percent plus or minus 0.02 percent,
   (b) a down-doped cladding with no abrupt change in index of refraction which contributes a refractive index decrease relative to that part of the fiber originating in said substrate tube of 0.19 percent plus or minus 0.02 percent,
   (c) a core diameter of 8.3 microns plus or minus 0.2 microns,
   (d) a ratio of diameter of the down-doped cladding to the diameter of the up-doped core of 6.0 plus or minus 0.2,
   the Δ of the fiber being greater than 0.3 percent and less than 0.75 percent, the dispersion of the fiber being less than 5 psec/nm-km within the wavelength range of 1.25–1.385 μm, and the cutoff wavelength being less than 1.31 μm.

* * * * *